US011015494B2

United States Patent
Monaco et al.

(10) Patent No.: US 11,015,494 B2
(45) Date of Patent: May 25, 2021

(54) ENGINE OIL PUMP COVER WITH SEAL

(71) Applicant: Harley-Davidson Motor Company Group, LLC, Milwaukee, WI (US)

(72) Inventors: Christopher Monaco, Antioch, IL (US); Philip Pierce, West Bend, WI (US); Bernard Enright, Brookfield, WI (US); Daniel Strain, Muskego, WI (US); William Pari, Milwaukee, WI (US)

(73) Assignee: Harley-Davidson Motor Company Group, LLC, Milwaukee, WI (US)

( * ) Notice: Subject to any disclaimer, the term of this patent is extended or adjusted under 35 U.S.C. 154(b) by 167 days.

(21) Appl. No.: 16/437,426

(22) Filed: Jun. 11, 2019

(65) Prior Publication Data
US 2020/0392876 A1   Dec. 17, 2020

(51) Int. Cl.
*F01M 1/02*   (2006.01)

(52) U.S. Cl.
CPC ....... *F01M 1/02* (2013.01); *F01M 2001/0269* (2013.01); *F01M 2001/0292* (2013.01)

(58) Field of Classification Search
CPC ... F01M 1/02; F01M 11/03; F01M 2001/0292
(Continued)

(56) References Cited

U.S. PATENT DOCUMENTS

| 2,559,079 A | * | 7/1951 | Leja | ........................ F02B 75/34 |
| | | | | 123/84 |
| 4,513,702 A | * | 4/1985 | Koga | ........................ F01M 9/06 |
| | | | | 123/193.5 |

(Continued)

FOREIGN PATENT DOCUMENTS

| DE | 102004021617 A1 | 12/2005 |
| DE | 102010026472 A1 | 1/2012 |

(Continued)

OTHER PUBLICATIONS

Non Patent Literature published by Nichols Portland, Jan. 23, 2019.
(Continued)

*Primary Examiner* — Long T Tran
*Assistant Examiner* — James J Kim
(74) *Attorney, Agent, or Firm* — Michael Best & Friedrich LLP (57) ABSTRACT

An internal combustion engine assembly includes a crankcase and a cam housing. The crankcase includes a crankcase cavity configured to receive a counterweight. The cam housing includes a cam housing cavity configured to receive a camshaft. A pump is positioned within the cam housing. The pump is configured to draw oil from an oil reservoir defined by the cam housing cavity. A crankshaft supports the counterweight for rotation therewith. The crankshaft is rotatably supported within the cam housing and is coupled to drive the pump. A bearing supports the crankshaft between the crankcase cavity and the cam housing cavity. The bearing includes an outer race. A seal is positioned between the pump and the bearing. The seal is positioned against the outer race to block the transmission of pressure fluctuations between the crankcase cavity and the oil reservoir.

20 Claims, 7 Drawing Sheets

(58) Field of Classification Search
USPC .................................................. 123/196 R
See application file for complete search history.

(56) References Cited

U.S. PATENT DOCUMENTS

| | | | | |
|---|---|---|---|---|
| 4,922,881 | A | * | 5/1990 | Tamba .................. F01M 13/04 123/572 |
| 5,241,932 | A | * | 9/1993 | Everts ..................... F01M 1/04 123/195 R |
| 5,341,781 | A | * | 8/1994 | Gerhardt ................ F01L 1/185 123/195 R |
| 6,047,678 | A | * | 4/2000 | Kurihara ............... F01M 13/04 123/196 R |
| 6,116,205 | A | | 9/2000 | Troxler et al. |
| 6,302,077 | B1 | | 10/2001 | Safarik et al. |
| 6,457,449 | B1 | | 10/2002 | Troxler et al. |
| 6,626,714 | B2 | | 9/2003 | Nozue |
| 6,807,936 | B1 | * | 10/2004 | Burger .................... F01M 1/16 123/196 R |
| 6,899,066 | B2 | | 5/2005 | Tiller et al. |
| 2017/0016363 | A1 | | 1/2017 | Nagata et al. |

FOREIGN PATENT DOCUMENTS

| | | |
|---|---|---|
| DE | 102014207071 B4 | 9/2018 |
| FR | 2987395 A1 | 8/2013 |
| JP | H10288252 A | 10/1998 |
| JP | 5799758 B2 | 10/2015 |
| WO | 2017/089073 A1 | 6/2017 |

OTHER PUBLICATIONS

Non Patent Literature, citation of a product in the marketplace, Harley-Davidson MY2017 Milwaukee Eight Engine, on sale or publicly available Aug. 23, 2016.

* cited by examiner

ENGINE OIL PUMP COVER WITH SEAL

FIELD OF THE INVENTION

The present invention relates to internal combustion engines, and more specifically to crankshaft-driven oil pumps thereof.

SUMMARY OF THE INVENTION

The present invention provides, in one aspect, an internal combustion engine assembly including a crankcase and a cam housing. The crankcase includes a crankcase cavity configured to receive a counterweight. The cam housing includes a cam housing cavity configured to receive a camshaft. A pump is positioned within the cam housing. The pump is configured to draw oil from an oil reservoir defined by the cam housing cavity. A crankshaft supports the counterweight for rotation therewith. The crankshaft is rotatably supported within the cam housing and is coupled to drive the pump. A bearing supports the crankshaft between the crankcase cavity and the cam housing cavity. The bearing includes an outer race. A seal is positioned between the pump and the bearing. The seal is positioned against the outer race to block the transmission of pressure fluctuations between the crankcase cavity and the oil reservoir.

The present invention provides, in another aspect, an internal combustion engine assembly including a crankcase and a cam housing. The crankcase includes a crankcase cavity configured to receive a counterweight. The cam housing includes a cam housing cavity configured to receive a camshaft. A wall separates the crankcase cavity and the cam housing cavity. A pump is positioned within the cam housing. The pump is configured to draw oil from an oil reservoir defined by the cam housing cavity. A crankshaft supports the counterweight for rotation therewith. The crankshaft extends through the wall between the cam housing cavity and the crankcase cavity. The crankshaft is rotatably supported within the cam housing and coupled to drive the pump. The crankshaft and the wall define a passage. The passage is sealed from the oil reservoir to block the transmission of pressure fluctuations between the crankcase cavity and the oil reservoir.

The present invention provides, in still another aspect, a pump cover of an oil pump for an internal combustion engine assembly. The oil pump includes a housing cooperating with the pump cover. The housing defines an intake pocket and a discharge pocket of the oil pump. The pump cover includes a body having an opening extending from a first side of the body to a second side of the body opposite the first side. The opening is configured to receive a crankshaft for driving the pump. The second side forms at least a portion of the intake pocket and the discharge pocket. A seal is positioned on the first side.

Other features and aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

Figure 1:
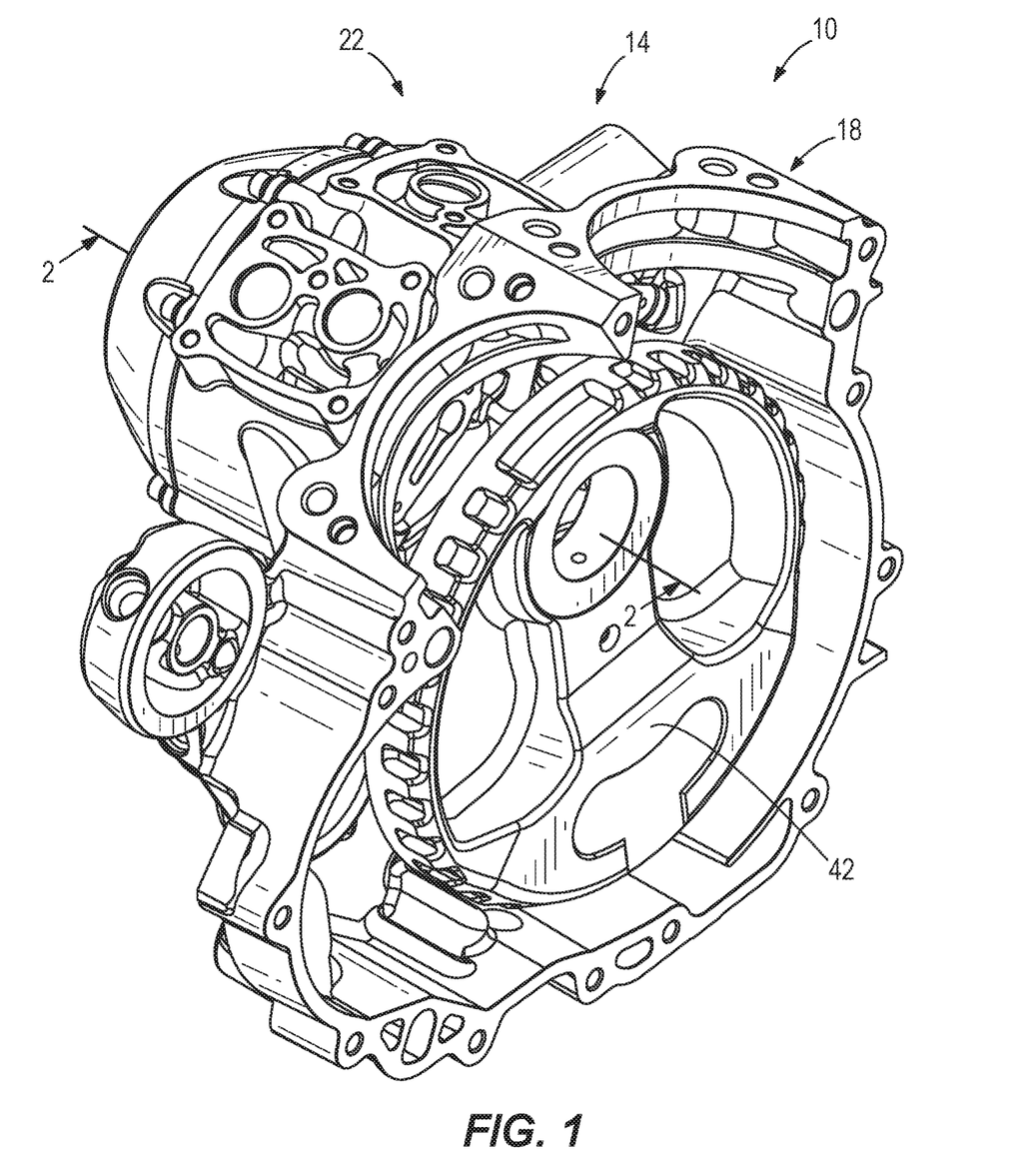
FIG. 1 is a perspective view of a portion of an engine including a crankcase and a cam chest.
Figure 2:
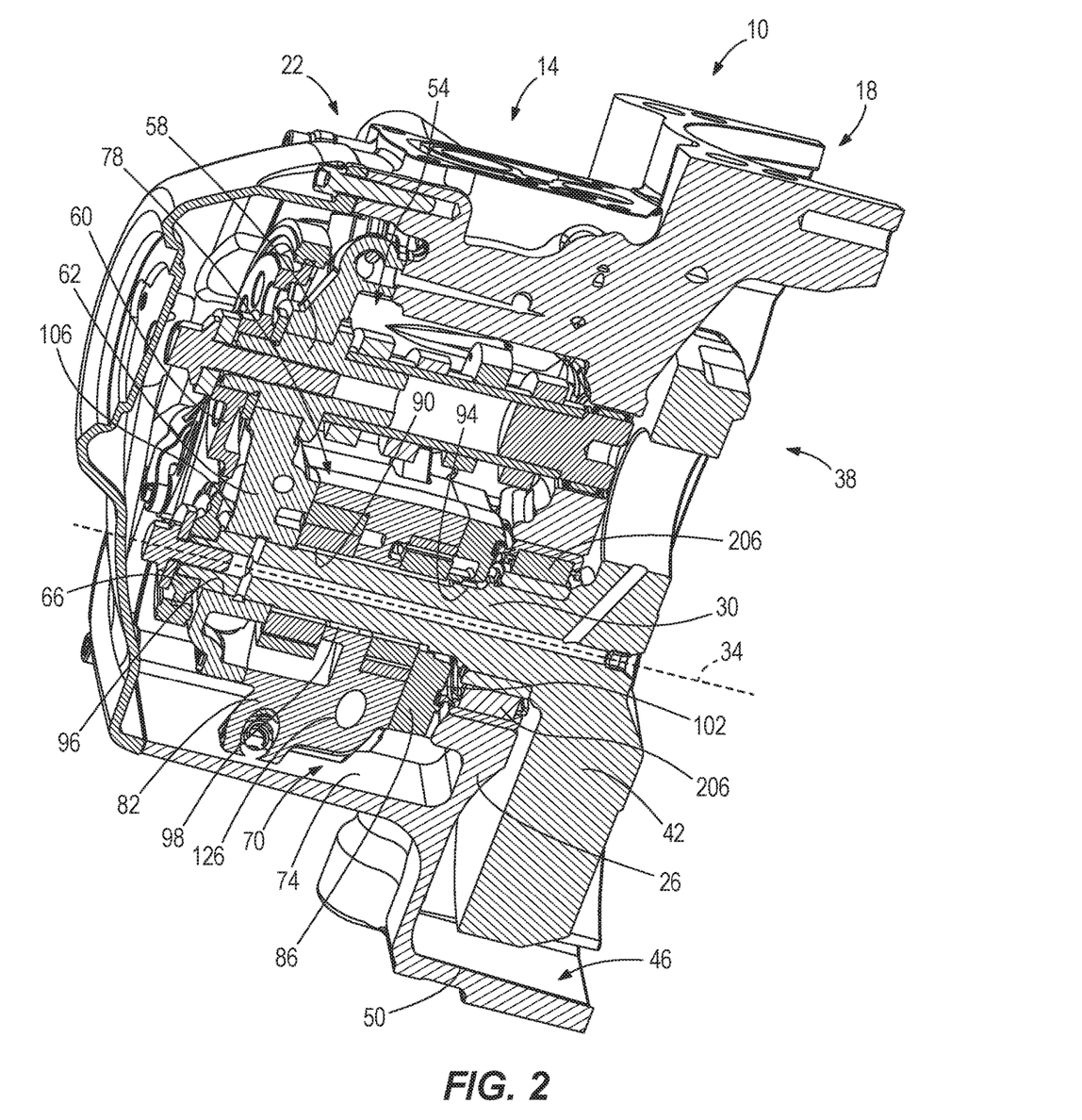
FIG. 2 is a cross-sectional view of the engine of the FIG. 1 illustrating a pump.

FIGS. 1 and 2 illustrate a portion of an internal combustion engine assembly 10 for a motorized vehicle (e.g., motorcycle). The internal combustion engine assembly 10 includes an engine block 14 having a crankcase 18 (only half of which is shown in FIGS. 1 and 2) and a cam housing or chest 22. A wall 26 (FIG. 2) separates the crankcase 18 and the cam chest 22. The crankcase 18 is configured to communicate with a pair of cylinders (not shown) mounted above the crankcase 18. Each cylinder is configured to reciprocally support a piston. Each piston is coupled to a crankshaft 30 rotatably supported within the engine block 14. The crankshaft 30 defines a rotational axis 34. The pistons are configured to reciprocate relative to the rotational axis 34 in reaction to the rotation of the crankshaft 30.

The crankcase 18 includes a first cavity 38 (i.e., to the right of the wall 26 from the frame of reference of FIG. 2). The first cavity 38 receives a counterweight 42 supported by and rotatable with the crankshaft 30. A crankcase sump 46 is defined by the first cavity 38. In particular, the first cavity 38 includes a bottom 50. The crankcase sump 46 is positioned at the bottom 50. The first cavity 38 is configured to receive oil draining from the counterweight 42 and other components of the crankcase 18. The oil is collected in the crankcase sump 46. As such, the crankcase sump 46 may be termed as the oil reservoir of the crankcase 18.

With reference to FIG. 2, the cam chest 22 includes a second cavity 54 (i.e., to the left of the wall 26 from the frame of reference of FIG. 2). The second cavity 54 receives the crankshaft 30 and a camshaft 58. In particular, the engine block 14 includes a camshaft support plate 62. The camshaft 58 extends between by the wall 26 and the camshaft support plate 62. The camshaft 58 is rotatably supported (e.g., by a bearing) by the wall 26 and the camshaft support plate 62. The camshaft 58 is coupled for synchronous rotation with the crankshaft 30. The illustrated camshaft 58 is coupled to the crankshaft 30 by an endless member 66 (e.g., belt, chain and sprockets, etc.) and rotates within the cam chest 22 at half of the speed of the crankshaft 30.

The second cavity 54 is defined between the wall 26 and the camshaft support plate 62. A cam chest sump 70 is defined by the second cavity 54. In particular, the second cavity 54 includes a bottom 74. The cam chest sump 70 is positioned at the bottom 74. The second cavity 54 is configured to receive oil draining from the camshaft 58 and other components of the cam chest 22. The oil is collected in the cam chest sump 70. As such, the cam chest sump 70 may be termed as the oil reservoir of the cam chest 22. The wall 26 inhibits the oil in the cam chest sump 70 from flowing to the crankcase sump 46.

With continued reference to FIG. 2, the cam chest 22 includes an oil pump 78. The oil pump 78 is positioned within the second cavity 54 and proximate the bottom 74 of the cam chest 22. More specifically, the oil pump 78 is below the camshaft 58 in the second cavity 54.

Figure 3:
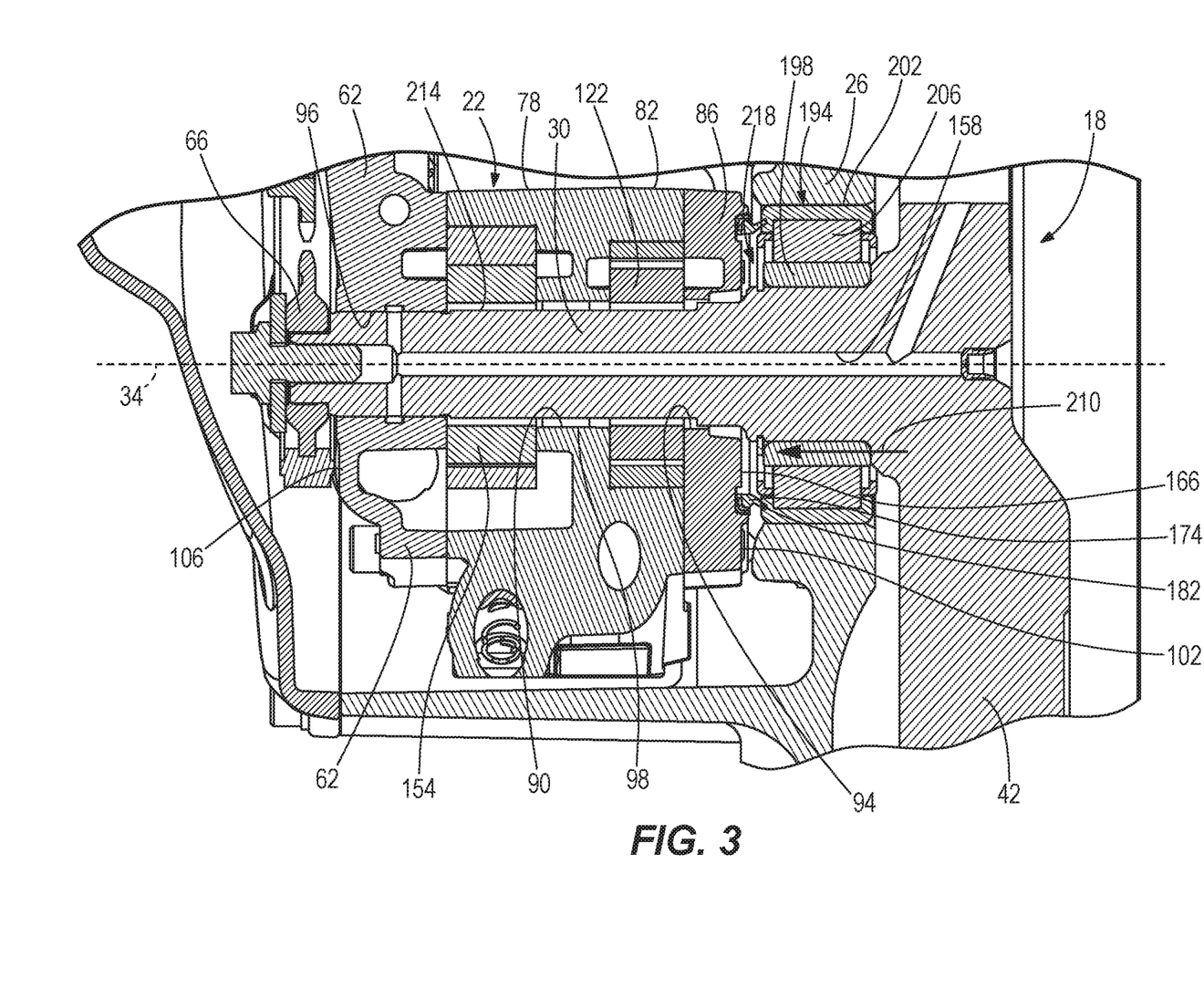
FIG. 3 is an enlarged plan view of the pump of FIG. 2.

With reference to FIGS. 2-8, the oil pump 78 includes a housing 82 and an end cover 86. Each of the housing 82, the end cover 86, and the camshaft support plate 62 defines an opening 90, 94, 96, respectively (FIG. 3). In particular, each opening 90, 94, 96 is defined by an inner wall 98 of the housing 82, the end cover 86, and the camshaft support plate 62. The openings 90, 94, 96 cooperate to form a bore extending through the oil pump 78 from a first end 102 to a second end 106 opposite the first end 102. The bore (i.e., each opening 90, 94, 96) is configured to receive the crankshaft 30. Each opening 90, 94, 96 may define a central axis that is coaxial with the rotational axis 34 of the crankshaft 30.

Figure 4:
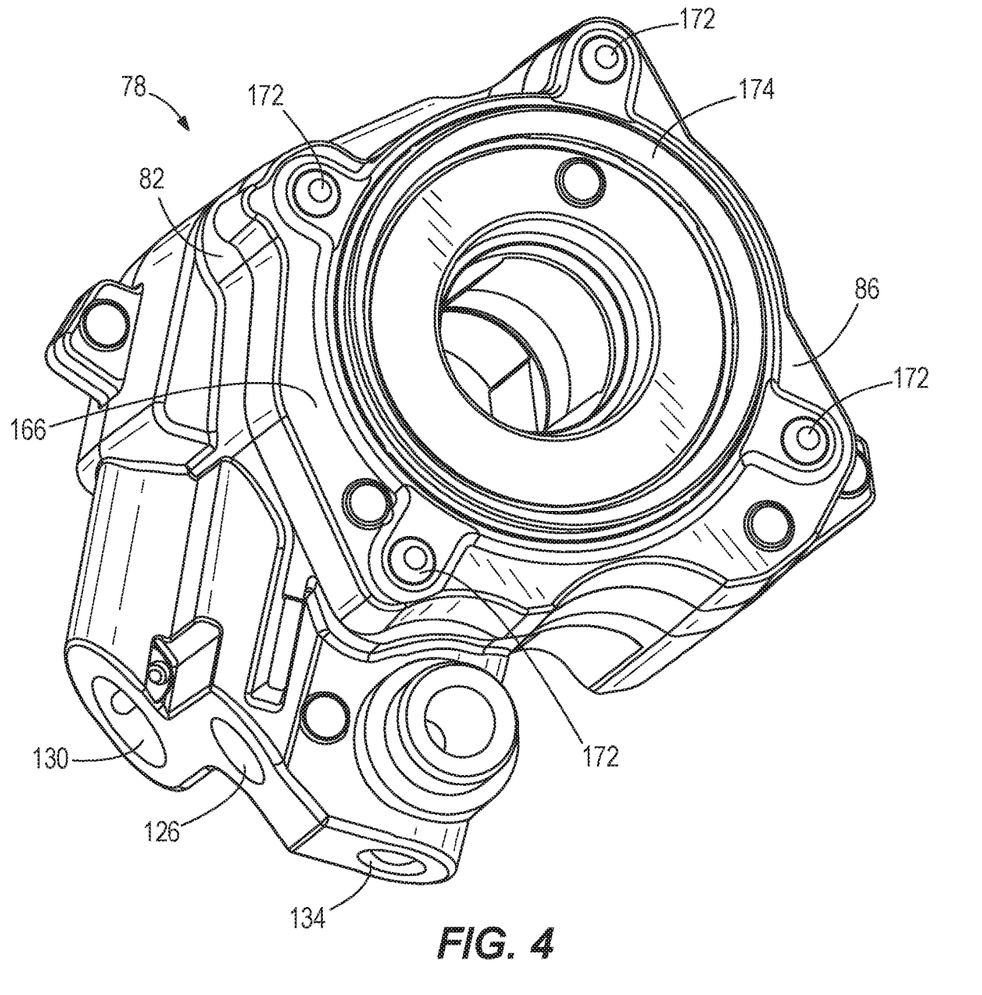
FIG. 4 is a perspective view of a pump including a pump housing and a cover.
Figure 5:
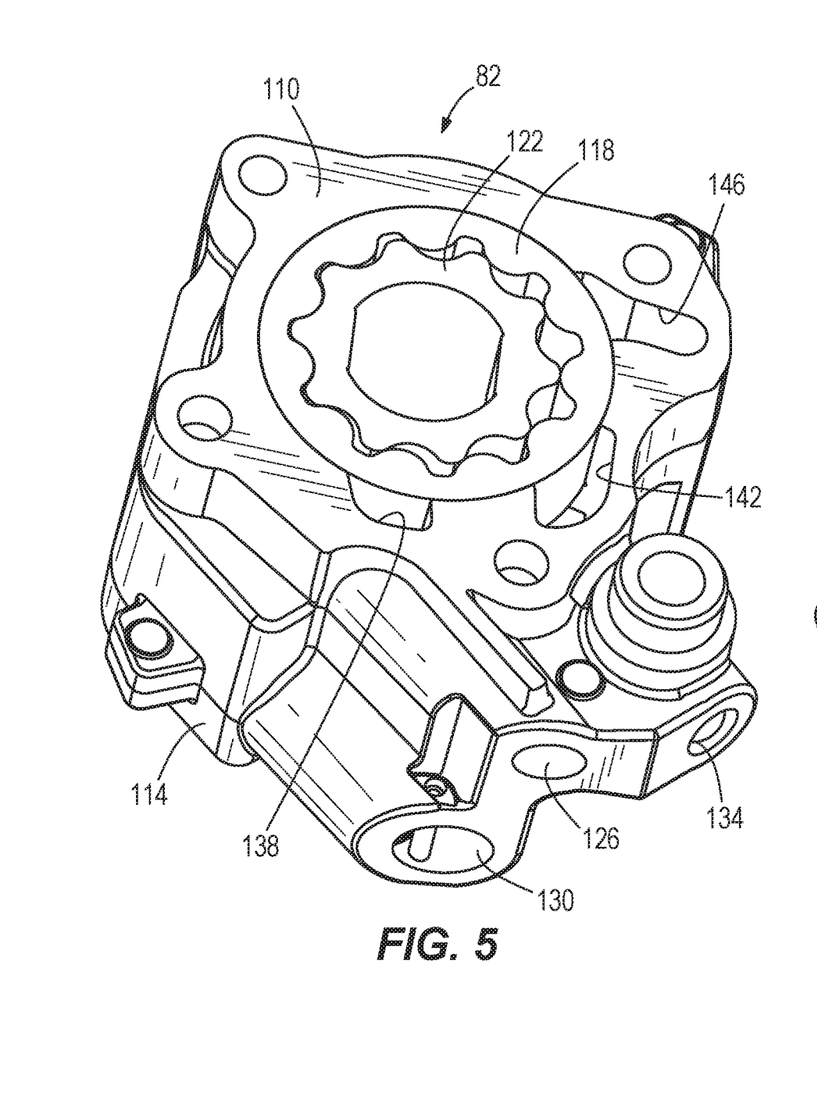
FIG. 5 is a perspective view of the pump housing of FIG. 4.

As shown in FIGS. 4-8, the illustrated oil pump 78 is a gerotor pump, a commercially available example of which is available from Nichols Portland Corporation. The pump 78 includes a scavenging side 110 and a feed side 114 (FIG. 5). The scavenging side 110 includes a gerotor ring 118, a gerotor gear 122, a first intake port 126, and a discharge port 130. The illustrated pump 78 further includes a second intake port 134. The gerotor gear 122 is positioned within the bore 90, 94, 96 and is coupled for co-rotation with the crankshaft 30. Specifically, the gerotor gear 122 is driven by the crankshaft 30 to rotate relative to the gerotor ring 118 in the bore 90, 94, 96. In the illustrated embodiment, the gerotor gear 122 is positioned eccentrically relative to the gerotor ring 118 such that the rotation of the gerotor gear 122 by the crankshaft 30 is eccentric relative to the gerotor ring 118. The crankshaft 30 is configured to drive the oil pump 78.

With reference to FIGS. 2 and 5, the first intake port 126 is in fluid communication with the cam chest sump 70. In particular, as shown in FIG. 2, the first intake port 126 extends toward the bottom 74 of the cam chest sump 22 such that an end of the first intake port 126 is positioned just above the bottom 74. The second intake port 134 is in fluid communication with the crankcase sump 46. In particular, the second intake port 134 is in fluid communication with the crankcase sump 46 through the wall 26 (e.g., by a fitting connected to the second intake port 134, the fitting forming a channel through the wall 26). The first intake port 126 is configured to draw the oil from the cam chest sump 70. The second intake port 134 is configured to draw the oil from the crankcase sump 46.

Figure 6:
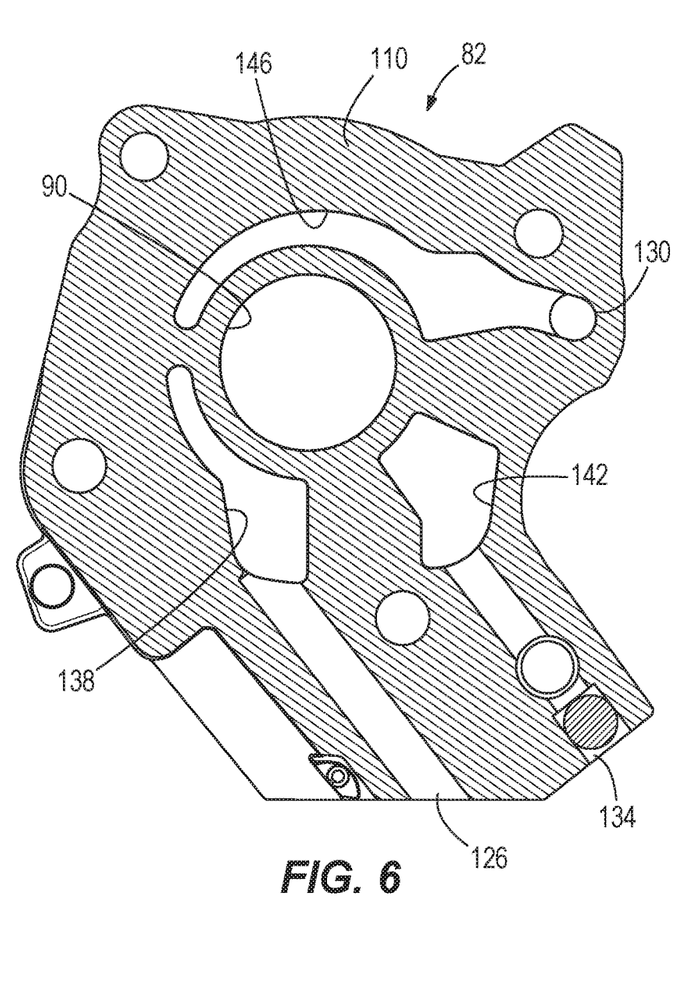
FIG. 6 is a cross-sectional view of the pump housing of FIG. 5.

FIGS. 5 and 6 illustrate the housing 82 of the oil pump 78. The illustrated housing 82 defines a first intake pocket or kidney 138 and a second intake pocket or kidney 142 in fluid communication with the first intake port 126 and the second intake port 134, respectively. The housing 82 further defines a discharge pocket or kidney 146 in fluid communication with the discharge port 130. Each of the first intake kidney 138, the second intake kidney 142, and the discharge kidney 146 is positioned adjacent the gerotor ring 118 and the gerotor gear 122. Each eccentric rotation of the gerotor gear 122 (by the crankshaft 30) draws the oil through the first and second intake ports 126, 134 and moves or drives the oil through the discharge port 130. Specifically, the eccentric rotation of the gerotor gear 122 causes negative pressure separately over the first and second intake kidneys 138, 142, thereby allowing the oil to be drawn from both the crankcase sump 46 and the cam chest sump 70. As such, the illustrated oil pump 78 may be termed as "a split-kidney" oil pump. The discharge kidney 146 is configured to receive the oil from the first and second intake kidneys 138, 142. The rotation of the gerotor gear 122 causes positive pressure over the discharge kidney 146, thereby forcing the oil from the discharge kidney 146 to the discharge port 130. As such, the oil is drawn from the crankcase sump 46 and the cam chest sump 70 through the housing 82 of the oil pump 78 to the discharge port 130. In the illustrated embodiment, the crankshaft 30 drives the gerotor gear 122 to rotate eccentrically in a counter-clockwise direction from the frame of reference of FIG. 5, thereby causing the oil pump 78 to draw the oil first from the cam chest sump 70, and then from the crankcase sump 46 before forcing the oil to the discharge port 130. In other embodiments, the gerotor gear 122 may rotate eccentrically in the clockwise direction from the frame of reference of FIG. 5.

The discharge port 130 is in fluid communication with a main oil reservoir (not shown) separate from the oil pump 78. The oil is cooled and de-aerated in the main oil reservoir after the oil pump 78 draws the oil from the crankcase sump 46 and the cam chest sump 70. The oil is then returned to the first cavity 38 (i.e., the crankcase 18) and the second cavity 54 (i.e., cam chest 22) by the feed side 114 of the oil pump 78. Similar to the scavenging side 110, the feed side 114 includes an intake port/kidney and a discharge port/kidney. The negative pressure created over the intake kidney by a second gear 154 (FIG. 3) draws the oil from the main oil reservoir, and the positive pressure over the discharge kidney created by the second gear 154 discharges the oil from the discharge kidney through the discharge port to a plurality of channels 158 in fluid communication with the first cavity 38 and the second cavity 54. For example, as shown in FIG. 2, the crankshaft 30 defines a channel 158 configured to receive the oil from the feed side 114 of the oil pump 78. The channel 158 distributes the oil in the first cavity 38 at the counterweight 42. Furthermore, in the illustrated embodiment, the camshaft support plate 62 may at least partially define the intake kidney and the discharge kidney on the feed side 114 of the housing 82 of the oil pump 78.

Figure 7:
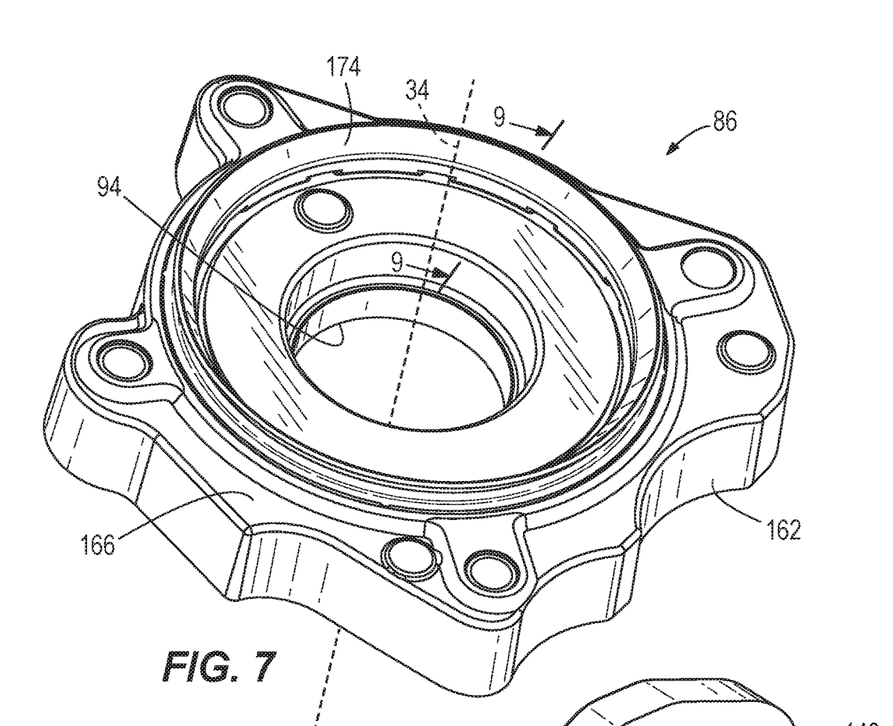
FIG. 7 is a front perspective view of the pump cover of FIG. 4, illustrating a seal.
Figure 8:
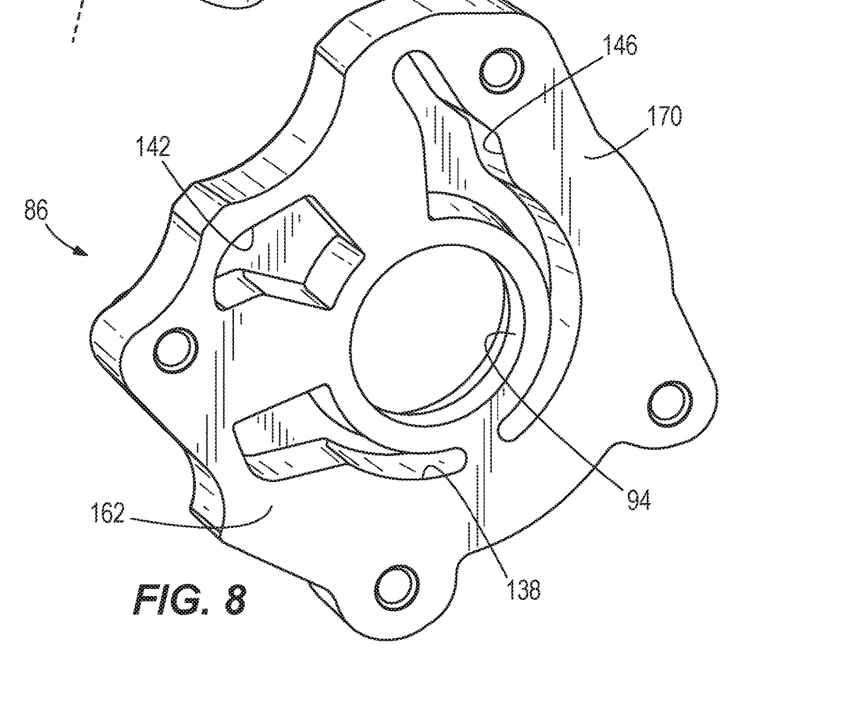
FIG. 8 is a rear perspective view of the pump cover of FIG. 7.

FIGS. 7 and 8 illustrate the end cover 86 of the oil pump 78. The end cover 86 includes a body 162 having a first side 166 and a second side 170. The first side 166 defines the first end 102 of the oil pump 78. The first side 166 is in facing relationship with the wall 26 (FIG. 3). The second side 170 forms a portion of the scavenging side 110 of the oil pump 78. In particular, the second side 170 defines a portion of the first intake kidney 138, a portion of the second intake kidney 142, and a portion of the discharge kidney 146 (FIG. 8). In other embodiments, the oil pump 78 may include only one intake port/kidney such that the housing 82 and the end cover 86 only define one intake kidney. Furthermore, the opening 94 of the end cover 86 extends through from the first side 166 to the second side 170. The end cover 86 is securable to the housing 82, for example by fasteners 172 (FIG. 4).

Figure 9:
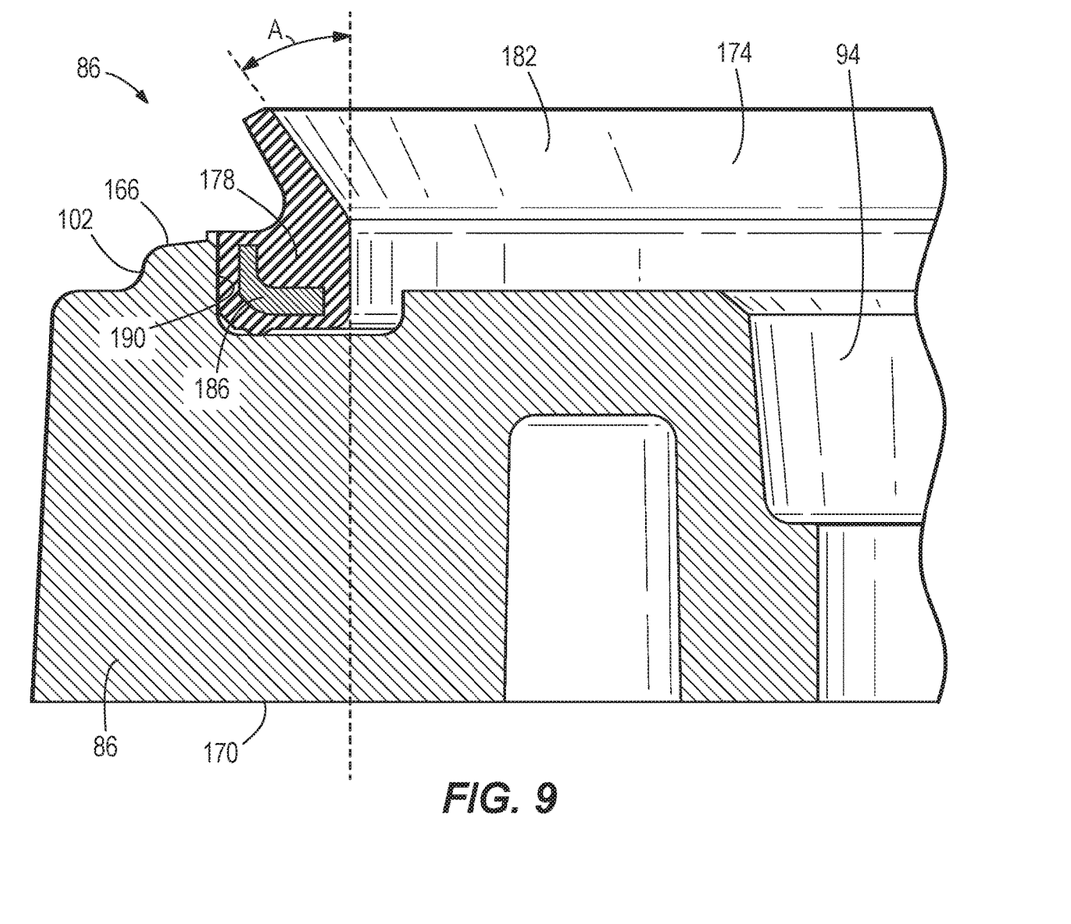
FIG. 9 is an enlarged, partial cross-sectional view of the pump cover and the seal of FIG. 7.

With reference to FIGS. 7 and 9, the first side 166 includes a seal 174. The illustrated seal 174 has an annular shape. The seal 174 is spaced radially outward from the opening 94 relative to the rotational axis 34 of the crankshaft 30. The seal 174 includes a first portion 178 and a second portion 182 protruding outwardly from the first portion 178. In particular, the first portion 178 is positioned on the first side 166 and may be secured thereto. The second portion 182 extends from the first portion 178 at an oblique angle A (FIG. 9) relative to the rotational axis 34 (or the central axis of the opening 94 of the end cover 86).

The first portion 178 includes a carrier body 186 (FIG. 9). In the illustrated embodiment, the carrier body 186 is embedded in the first portion 178. The illustrated carrier body 186 has an annular shape. Furthermore, the seal 174 may be formed by at least two different materials. In the illustrated embodiment, the first portion 178 and the second portion 182 are formed by a first material and the carrier body 186 is formed by a second material that is more rigid than the first material. For example, the first and second portions 178, 182 are formed by an elastomeric material. The carrier body 186 is formed by a metal such as steel. In other embodiments, the carrier body 186 may be formed by a hard plastic. As such, the carrier body 186 may provide rigidity and/or stiffness to the seal 174. In one embodiment, the first material is molded onto the carrier body 186 to form the seal 174. In other embodiments, the seal 174 may be formed by only one material (e.g., the first, elastomeric material).

With continued reference to FIGS. 7 and 9, the seal 174 is integrated with the first side 166 of the end cover 86. In the illustrated embodiment, the first portion 178 is secured to the first side 166. The first portion 178 may be secured such as by press-fitting within a groove 190 defined on the first side 166 of the body 162.

With reference to FIG. 3, the crankshaft 30 is rotatably supported within the cam chest 22 by a bearing 194 positioned within and supported by the wall 26. As such, the bearing 194 supports the crankshaft 30 between the crankcase 18 and the cam chest 22. The crankshaft 30 extends from the counterweight 42 through the wall 26, the cam chest 22 including the oil pump 78, and the camshaft support plate 62. The illustrated bearing 194 is a rolling element bearing. The rolling element bearing 194 includes an inner race 198, an outer race 202, and a plurality of rolling elements 206 (e.g., cylindrical rolling elements) supported therebetween. The inner race 198 is coupled for co-rotation with the crankshaft 30. The outer race 202 is spaced radially outward relative to the rotational axis 34 of the crankshaft 30 from the inner race 198 within the wall 26. The outer race 202 is supported by the wall 26. The inner race 198 is configured to rotate relative to the outer race 202 by the rotation of the crankshaft 30.

The bearing 194 includes a plurality of spaces. Specifically, the spaces are defined circumferentially between the adjacent rolling elements 206 supported between the inner race 198 and the outer race 202 of the bearing 194. Additionally, the spaces are defined radially between crankshaft 30 and the outer race 202 (from the frame of reference of FIG. 3). Further, in the illustrated embodiment, the wall 26 adjacent the outer race 202 of the bearing 194 may further define the spaces. The spaces form a first passage 210 extending through the wall 26 from the first cavity 38 to the second cavity 54. The spaces, in the absence of the seal 174, fluidly connect the first cavity 38 and the second cavity 54 through the wall 26.

The second cavity 54 (i.e., the cam chest 22) further includes a second passage 214. The second passage 214 is defined between the crankshaft 30 and the inner wall of the oil pump (i.e., the inner wall 98 defining the opening 90, 94, 96 of each of the housing 82 and the end cover 86). As such, the illustrated second passage 214 has an annular shape extending axially along the rotational axis 34 of the crankshaft 30 from the first end 102 of the oil pump 78 to the second end 106.

With continued reference to FIG. 3, an intermediate space 218 is defined between the first end 102 of the oil pump 78 and the wall 26. The intermediate space 218 fluidly connects the first passage 210 and the second passage 214. The seal 174 of the oil pump 78 is positioned within the intermediate space 218.

The seal 174 extends between the first end 102 of the oil pump 78 and the wall 26 in the intermediate space 218. In particular, in the illustrated embodiment, the first portion 178 of the seal 174 contacts the first side 166 of the end cover 86, and the second portion 182 contacts the outer race 202 of the bearing 194. As such, the seal 174 is positioned against the end cover 86 and the outer race 202. In other embodiments, the second portion 182 of the seal 174 contacts the wall 26 such that the seal 174 is positioned against the wall 26.

The first portion 178 and/or the second portion 182 of the seal 174 may be sized relative to oil pump 78, the outer race 202, and/or the intermediate space 218 defined therebetween to promote or require deflection of the seal 174 during installation. Said another way, an assembly interference, which may be defined as a rigid component of the cam chest 22 that is located in an axial and/or radial position with respect to the intermediate space 218 relative to the rotational axis 34, is configured to deflect the seal 174 when the seal 174 is installed in the cam chest 22. For example, as shown in FIG. 3, the seal 174 is over-sized in the axial direction (i.e., a tip of the second portion 182 is shown to overlap the outer race 202 of the bearing 194) such that the seal 174 does not fit (in its original shape) within the intermediate space 218 unless deflection of the seal 174 or portions thereof occurs. The seal deflection provides a preload (in the axial and radial direction relative to the rotational axis 34) between the oil pump 78 and the bearing 194 that may aid in sealing performance. In the illustrated embodiment, the second portion 182 of the seal 174 is formed of the elastomeric material for outward radial deflection of the second portion 182 with respect to the first portion 178 relative to the rotational axis 34. Specifically, when the second portion 182 engages the outer race 202 of the bearing 194 when the seal 174 is positioned within the intermediate space 218, the second portion 182 deflects radially outward relative to the rotational axis 34 to allow the seal 174 to fit within the intermediate space 218. As such, in this example, the outer race 202 is the "axial assembly interference." In another example, the wall 26 may be the assembly interference. In addition, the first portion 178 (i.e., the section of the first portion 178 formed of the first, elastomeric material) and/or the second portion 182 may be further configured to compress axially relative to the rotational axis 34 to allow the seal 174 to fit within the intermediate space 218. Still further, in other embodiments, the first portion 178 may also expand radially outward relative to the rotational axis 34. In yet still other embodiments, the seal 174 may be sized to fit within the intermediate space 218 between the first end 102 of the oil pump 78 and the wall 26 without deflection of the seal 174 or portions thereof.

The seal 174 is positioned between the oil pump 78 and the wall 26 to fluidly disconnect specific areas of the second cavity 54 (i.e., the cam chest sump 70) from the first cavity 28 (i.e., crankcase 18). In particular, the seal 174 is positioned such that the first passage 210 and the second passage 214 of the cam chest 22 are fluidly connected, and the remaining portions of the second cavity 54 are not fluidly connected. As such, the cam chest sump 70 of the second cavity 54 is not fluidly connected to the first passage 210, the second passage 214, the intermediate passage 218 and/or the first cavity 38. Therefore, the seal 174 is positioned to block the transmission of pressure fluctuations generated in the first cavity 38 (i.e., the crankcase 18) from reaching the cam chest sump 70 of the second cavity 54. In particular, the blockage of pressure fluctuations between the first cavity 38 and the cam chest sump 70 may facilitate the negative pressure created over the first intake kidney 138 within the oil pump 78, thereby improving the ability of the oil pump 78 to draw oil from the crankcase sump 46, the cam chest sump 70, or both. Additionally, in the illustrated embodiment, the seal 174 is positioned such that the second passage 214 receives the transmission of pressure fluctuations generated in the first cavity 38.

In the illustrated embodiment, the seal 174 is positioned within the intermediate space 218 when the oil pump 78 (i.e., the housing 82 and the end cover 86) is installed (i.e., when the oil pump 78 is positioned within the second cavity 54 defined by the cam chest 22). In particular, the seal 174 is integrated with the end cover 86 of the oil pump 78 to facilitate the installation of the seal 174 during assembly of the engine block 14. As such, the illustrated seal 174 contributes to an axial stack-up of the components of the cam chest 22 along the crankshaft 30. In other embodiments, the seal 174 may be positioned in the intermediate space 218 separate from the oil pump 78. The seal 174 and/or the end cover 86 may be retrofittable to an existing oil pump 78 or provided as original equipment of the oil pump 78.

Although the invention has been described in detail with reference to certain preferred embodiments, variations and modifications exist within the scope and spirit of one or more independent aspects of the invention as described.

Various features and advantages of the invention are set forth in the following claims.

What is claimed is:

1. An internal combustion engine assembly comprising:
   a crankcase including a crankcase cavity configured to receive a counterweight;
   a cam housing including a cam housing cavity configured to receive a camshaft;
   a pump positioned within the cam housing, the pump configured to draw oil from an oil reservoir defined by the cam housing cavity;
   a crankshaft supporting the counterweight for rotation therewith, the crankshaft rotatably supported within the cam housing and coupled to drive the pump;
   a bearing supporting the crankshaft between the crankcase cavity and the cam housing cavity, the bearing including an outer race; and
   a seal positioned between the pump and the bearing, the seal positioned against the outer race to block the transmission of pressure fluctuations between the crankcase cavity and the oil reservoir.

2. The internal combustion engine assembly of claim 1, wherein the pump includes a housing and an end cover, wherein the housing defines an intake pocket and a discharge pocket, and wherein the seal is positioned against the end cover.

3. The internal combustion engine assembly of claim 2, wherein the intake pocket is a first intake pocket, the housing further defining a second intake pocket, and wherein the first intake pocket is configured to draw oil from the cam chest cavity and the second intake pocket is configured to draw oil from the crankcase cavity.

4. The internal combustion engine assembly of claim 2, wherein the end cover includes a first side and the second side, wherein the seal is integrated with the first side, and wherein the second side defines at least a portion of the intake pocket.

5. The internal combustion engine assembly of claim 1, wherein the bearing is supported by a wall separating the crankcase cavity from the cam housing cavity, wherein the crankshaft and the outer race of the bearing define a passage that, in the absence of the seal, fluidly connects the cam housing cavity and the crankcase cavity through the wall.

6. The internal combustion engine assembly of claim 1, wherein the crankshaft defines a rotational axis, wherein the seal comprises an elastomeric material, and wherein an axial assembly interference is configured to deflect the seal when the pump is installed.

7. The internal combustion engine assembly of claim 1, wherein the seal includes a carrier body at least partially embedded in an elastomeric material.

8. An internal combustion engine assembly comprising:
   a crankcase including a crankcase cavity configured to receive a counterweight;
   a cam housing including a cam housing cavity configured to receive a camshaft;
   a wall separating the crankcase cavity and the cam housing cavity;
   a pump positioned within the cam housing, the pump configured to draw oil from an oil reservoir defined by the cam housing cavity; and
   a crankshaft supporting the counterweight for rotation therewith, the crankshaft extending through the wall between the cam housing cavity and the crankcase cavity, the crankshaft rotatably supported within the cam housing and coupled to drive the pump,
   wherein the crankshaft and the wall define a passage, the passage being sealed from the oil reservoir to block the transmission of pressure fluctuations between the crankcase cavity and the oil reservoir.

9. The internal combustion engine assembly of claim 8, wherein the passage is a first passage, wherein the crankshaft extends through pump, and wherein a second passage is defined between an inner wall of the pump and the crankshaft, the second passage fluidly connected to the first passage to receive the transmission of pressure fluctuations from the crankcase cavity.

10. The internal combustion engine assembly of claim 8, further comprising a seal positioned between the wall and the pump for sealing the passage from the oil reservoir, and a bearing supported by the wall, wherein the crankshaft is rotatably supported by the bearing.

11. The internal combustion engine assembly of claim 10, wherein the seal is integrated with an end cover of the pump, wherein the seal comprises an elastomeric material, wherein the crankshaft defines a rotational axis, and wherein one of the wall and an outer race of the bearing is an axial assembly interference configured to deflect the seal when the pump is installed.

12. The internal combustion engine assembly of claim 8, wherein the pump includes a housing and an end cover, wherein the housing defines an intake pocket and a discharge pocket, and wherein a seal is positioned against the end cover.

13. The internal combustion engine assembly of claim 12, wherein the end cover includes a first side and the second side, wherein the seal is integrated with the first side, and wherein the second side defines at least a portion of the intake pocket.

14. A pump cover of an oil pump for an internal combustion engine assembly, the oil pump including a housing cooperating with the pump cover, the housing defining an intake pocket and a discharge pocket of the oil pump, the pump cover comprising:
   a body having an opening extending from a first side of the body to a second side of the body opposite the first side, the opening configured to receive a crankshaft for driving the pump, the second side forming at least a portion of the intake pocket and the discharge pocket; and
   a seal positioned on the first side.

15. The pump cover of claim 14, wherein the intake pocket is a first intake pocket, the second side of the body further defining at least a portion of a second intake pocket.

16. The pump cover of claim 14, wherein the seal is integrated with the first side.

17. The pump cover of claim 14, wherein the seal comprises a first portion secured to the first side, and a second portion protruding outwardly from the first portion.

18. The pump cover of claim 17, wherein the opening defines a central axis, and wherein the second portion extends from the first portion at an oblique angle relative to the central axis.

19. The pump cover of claim 14, wherein the seal is formed as an annular member comprising a first material, and wherein the seal includes a carrier body comprising a second material more rigid than the first material, the carrier body being at least partially embedded in the first material.

20. The pump cover of claim 19, wherein the first material is an elastomeric material, and the second material is one of a metal and a plastic.

\* \* \* \* \*